United States Patent Office
2,727,027
Patented Dec. 13, 1955

2,727,027

PROCESS FOR PREPARING OXYALKYLATED DERIVATIVES

Louis T. Monson, Puente, and Woodrow J. Dickson, Monterey Park, Calif., assignors to Petrolite Corporation, Los Angeles, Calif., a corporation of Delaware No Drawing. Application January 19, 1955,
Serial No. 482,884

12 Claims. (Cl. 260—112)

This invention relates to the preparation of substantially anhydrous and substantially undiluted oxyalkylated derivatives of a particular class of oxyalkylation-susceptible organic compounds which, because of certain characteristics they possess, are not otherwise oxyalkylatable to produce such derivatives.

Oxyalkylation-susceptible organic compounds are characterized by their possession of labile hydrogen atoms, i. e., hydrogen attoms attached to oxygen, nitrogen, or sulfur. Their oxyalkylation may proceed with greater or lesser readiness; but oxyalkylated derivatives can be prepared from them.

The oxyalkylating agents conventionally employed to produce oxyalkylated derivatives are the lower alkylene oxides, ethylene oxide, propylene oxide, butylene oxide, glycid, and methylglycid. These may be defined as alpha-beta alkylene oxides containing four carbon atoms or less. They may be employed singly, in sequence, or in admixture.

Unfortunately, there are some situations, like those with which this invention is concerned, in which the employment of such conventional oxyalkylating agents is not practicable. Some starting materials, although inherently oxyalkylation-susceptible, are solids which are substantially insoluble in any of the oxyalkylation-resistant solvents available for use in the preparation of oxyalkylated derivatives.

For example, many oxyalkylation-susceptible solids are insoluble in xylene, which is a frequently used solvent in oxyalkylation procedures. Xylene is oxyalkylation-resistant and is readily separable from the oxyalkylation mass by simple distillation.

Furthermore, even though such starting materials may be soluble in a few unusual oxyalkylation-resistant solvents, the latter are themselves comparatively non-volatile. Various ethers might in some cases be considered suitable solvents for the oxyalkylation-susceptible solid starting material. Such ethers, like the diethers of the polyglycols, in addition to being expensive, are not susceptible to easy separation from the oxyalkylation mass by distillation. Hence, they are not readily recoverable from the oxyalkylation mass by distillation, to leave an undiluted oxyalkylated derivative.

Some solids which are oxyalkylation-susceptible are in fact most soluble in water; but water is not an acceptable solvent for use in oxyalkylation processes employing the conventionally used alkylene oxides because it reacts with such alkylene oxides to produce polyglycols, during oxyalkylation.

We are aware that it has been proposed in the past to conduct oxyalkylations using the conventional alkylene oxides in aqueous solutions, presumably on the assumption that the oxide did not react with the water. However, it is now established that such reaction with the water occurs to some extent. The oxyalkylated mass produced in such aqueous systems therefore contains varying proportions of alkylene glycols as contaminants or adulterants. Our process avoids this difficulty because it is conducted under substantially anhydrous conditions in all cases. The starting solid material, the catalyst, and the alkylene carbonates employed by us are all used in substantially anhydrous form.

Furthermore, many oxyalkylation-susceptible solids cannot be used in undiluted form in an oxyalkylation process using the alkylene oxides, and simply liquefied by heating prior to introduction of the oxyalkylating agent, because they undergo partial decomposition as they melt. If maintained at the temperature at which fusion just begins to be apparent, for a time such as 15 minutes, they undergo at least partial decomposition. If they exhibit such behavior in the presence of an oxyalkylation catalyst, like the alkali carbonates, they come within our class of suitable starting materials for use in our present process.

The foregoing statement of difficulties is applicable to greater or lesser extent to a number of oxyalkylation-susceptible compounds, including those recited below. The alkylene oxides are not usable for their oxyalkylation for the above stated reasons.

Our present invention overcomes such difficulties and permits oxyalkylation of such materials to be accomplished by simple and inexpensive means. Thus, we employ as primary oxyalkylating agents the carbonates which are the counterparts of the foregoing alkylene oxides, viz., ethylene carbonate, propylene carbonate, butylene carbonate, hydroxypropylene carbonate, and hydroxybutylene carbonate. Of these, only ethylene carbonate and propylene carbonate are currently in commercial production, although the others will doubtless achieve similar commercial status in time.

More specifically, our invention relates to a process for preparing substantially anhydrous, substantially undiluted oxyalkylated derivatives from an anhydrous, solid, oxyalkylation-susceptible protein, which solid satisfies one of the following two conditions: (a) it is infusible; (b) it suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in reacting said anhydrous solid with at least one anhydrous alkylene carbonate selected from the class consisting of ethylene carbonate, propylene carbonate, butylene carbonate, hydroxypropylene carbonate, and hydroxybutylene carbonate, by contacting said solid and said alkylene carbonate in presence of an anhydrous oxyalkylation catalyst at a temperature producing effervesence of carbon dioxide and for a period of time sufficient to form an oxyalkylated derivative of said solid; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid.

In its narrower scope and more important aspect, our invention relates to a two-step process for preparing substantially anhydrous, substantially undiluted oxyalkylated derivatives from an anhydrous, solid, oxyalkylation-susceptible protein, which solid satisfies one of the following two conditions: (a) it is infusible; (b) it suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in: (A) first reacting said anhydrous solid with at least one anhydrous alkylene carbonate selected from the class consisting of ethylene carbonate, propylene carbonate, butylene carbonate, hydroxypropylene carbonate, and hydroxybutylene carbonate, by contacting said solid and said alkylene oxide in presence of an anhydrous oxyalkylation catalyst at a temperature producing effervescence of carbon dioxide and for a period of time sufficient to form an oxyalkylated derivative of said solid; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one member selected from the aforesaid class of alkylene oxides.

Briefly described, our broad process is practiced by introducing into a suitable processing vessel the solid, oxyalkylation-susceptible starting material, preferably in finely divided form; the desired or required proportion of alkylene carbonate; and a minor proportion of an alkaline catalyst such as an alkali carbonate. The mixture is warmed, preferably with stirring. As the temperature reaches a certain critical level, usually somewhat above 100° C., there is a vigorous effervescence in which carbon dioxide is liberated, and the oxyalkylated derivative is formed. In such instances where the starting material is acidic, it is used at least partially in the form of a salt, e. g., an alkali salt such as may be produced in situ by adding enough alkaline catalyst to leave a slight excess over what is required to leave the mixture slightly alkaline.

It is sometimes desirable to modify this general procedure in various minor ways. For example, the alkylene carbonate is introduced into a vessel and warmed until liquid. The catalyst is added. The solid, oxyalkylation-susceptible material is then slowly introduced in finely divided form, with stirring, and the temperature is slowly raised to the reaction point. Such procedural variation is useful where the oxyalkylation-susceptibility of the starting material is not great and where use of the first-described procedure above would produce a solid mass in the vessel which could not be readily handled thereafter.

In the two-step embodiment of our process, we usually employ only enough alkylene carbonate in the first step to produce a liquid or readily liquefiable derivative, which contains a relatively small proportion of oxyalkylene radicals. We then continue oxyalkylation using the conventional alkylene oxides. Stated another way, this two-step process is employed to produce, first, intermediates; then more highly oxyalkylated products are prepared in the second step using the more economical, conventional alkylene oxides. This two-step process is the more important aspect of our invention.

In the appended claims, we have specified that the intermediate product prepared in the first step of the two-step process shall be a liquid or at least liquefiable at the temperature required to effect the oxyalkylation by use of the alkylene oxides in the second step of our process. Said second step is conducted at conventional oxyalkylation temperatures, usually between about 100° C. and 200° C.

One incidental advantage of using the alkylene carbonates for oxyalkylation is that they are relatively inert materials as compared with the alkylene oxides. Their use therefore entails smaller hazards. Oxyalkylations using them are conducted with greater safety than if the alkylene oxides were employed. Processing vessels are usually not required to be pressure-resistant when the alkylene carbonates are employed, whereas ethylene oxide and propylene oxide, for example, are required to be employed in pressure vessels because of their physical properties.

All oxyalkylation-susceptible proteins usable as starting materials do not react with equal readiness with the alkylene carbonates in our process. Where the starting material, although presumably oxyalkylation-susceptible as judged by its structure, is of very high molecular weight, or where steric or other obscure influences are adverse, oxyalkylation may proceed at extremely slow rates. However, if the starting material is oxyalkylation-susceptible its oxyalkylation may be accomplished in due time by means of the alkylene carbonates mentioned above.

The temperature at which the oxyalkylation reaction will occur, using the alkylene carbonates, must be expected to vary somewhat with the choice of protein starting material and alkylene carbonate. In all cases, the proper technique to be initially employed is to advance the temperature cautiously and so to determine the minimum temperature required to effect reaction. This procedure requires no especial skill and no experimentation, in that the vigorous effervescence resulting from the liberation of carbon dioxide in the reaction is ready evidence of such reaction. As stated above, the reaction usually requires a temperature somewhat above 100° C. The maximum feasible oxyalkylation temperature is of course the decomposition temperature for the mixture of solid starting material, catalyst, and alkylene carbonate, and above which temperature pyrolysis of the starting material, polymerization of the alkylene carbonate, or other undesired reaction begins to occur.

The oxyalkylation catalysts employed by us are usually the alkali carbonates such as sodium or potassium carbonate, in substantially anhydrous form. Where the starting material is acidic, at least sufficient alkali carbonate should be added to neutralize such acidity. Thereafter an additional amount of alkali carbonate is usually desirably included to accelerate the oxyalkylation process. However, in some instances the alkali-neutralized starting material is sufficiently alkaline to supply the desired catalytic influence, without addition of further amounts of alkali carbonate.

The finished oxyalkylated product will of course contain such inorganic catalyst. The catalyst will usually separate readily from the oxyalkylated mass on standing, especially if slightly warm. Since the residual proportions of catalyst in the supernatant product are usually of very small magnitude after such settling, we consider they do not materially dilute or contaminate our finished products.

In some instances, solid, oxyalkylation-susceptible substances, which may have been stated in the literature to have definite melting points, are nevertheless susceptible to progressive decomposition if maintained at or about the temperature at which they begin to fuse, for any period of time. Some such substances similarly undergo progressive deterioration if subjected to such temperatures in the presence of an alkaline material, like an oxyalkylation catalyst, for any period of time. Such substances which, although they may have recorded definite melting points, are unstable under oxyalkylating conditions as described, are included among our usable starting materials.

We have therefore limited our usable starting materials to those which are either (1) infusible or which (2) suffer at least partial decomposition if maintained at their beginning-of-fusion temperature for a period of at least 15 minutes in the presence of an oxyalkylation catalyst. Additionally, such solid starting material must be insoluble in oxyalkylation-resistant, distillation-separable solvents, as already stated.

As the molecular weight of the alkylene carbonate rises, its reactivity with the protein starting materials is reduced. Since, for example, ethylene carbonate is more reactive than propylene carbonate, and propylene carbonate is more reactive than butylene carbonate, there may be marked differences in the speed of oxyalkylation when different alkylene carbonates are used. In marginal cases, it will be understood, a protein starting material may be oxyalkylation-susceptible in the sense that it is readily reactive toward ethylene carbonate or propylene carbonate, but it may be rather insensitive toward butylene carbonate.

Our broad process may be practiced using more than one alkylene carbonate, and our two-step process may be practiced using, in addition, more than one alkylene oxide, to produce mixed oxyalkylated derivatives. In such cases, the alkylene carbonates may be employed in sequence or they may be employed as a mixture, as desired. The same is true of the alkylene oxides employed in our two-step process, which may be used in sequence or as a mixture.

Within our recited class of oxyalkylation susceptible protein starting materials are some which may be referred to as "high-sulfur proteins" and others which may be termed "low-sulfur proteins." In so describing them, we recognize that the chemistry of the proteins is ill-defined, and that some authorities state that all proteins contain some sulfur. Certainly, those proteins which have been built principally from amino-acids containing sulfur will themselves possess a relatively high sulfur content; whereas, those built principally from amino-acids not containing sulfur will possess a relatively low or even negligible sulfur content. The high-sulfur proteins contain a relatively large proportion of residues of cystine, cysteine, methionine, and djenkolic acid, and have sulfur contents greater than about 1%. Those proteins containing few if any residues of these amino-acids have sulfur contents not greater than about 1%; and we refer to these as "low-sulfur proteins."

Among the low-sulfur proteins which are oxyalkylation-susceptible starting materials suitable for use in our present process are casein, gliadin, zein, hordein, plutenin, oryzenin, salmin, and clupein, among others. Casein, which occurs in milk, is a phosphoprotein, and contains phosphorus. It is a highly suitable starting material here. Gliadin, which occurs in wheat; zein, which occurs in corn; and hordein, which occurs in barley, are in the prolamine class of proteins. Glutenin and oryzenin are glutelin-class proteins, and occur in wheat and rice, respectively. The protamines, salmin and clupein, occur in salmon and herring, respectively. All these proteins are useful starting materials here.

Other proteins suitable as starting materials here are the albumins, such as serum albumin, lactalbumin, ricin (from castor beans), an egg albumin, among others. Blood solids are primarily blood albumin. Fibrous materials like hair, both human and animal, feathers, horns, hooves, wool, etc., are primarily keratin, a protein. Human hair, for example, is said to have 14.7% cystine and 5.1% methionine in its structure, and to contain 5.0% sulfur. Hen feathers similarly are said to contain 6.9% cystine and 1.4% methionine, and to have a sulfur content of 2.1%. Finger nails are said to contain 12.0% cystine, from which they may be calculated to contain at least 3% sulfur. Cattle horn, with 5.7% cystine and 4.7% methionine, is said to contain 2.5% sulfur. Even snake skin is said to contain 4.1% cystine and 2.3% methionine, and to have a sulfur content of 1.6%.

Molecular weights of some of these proteinaceous starting materials are relatively high. Egg albumin has been estimated to have a molecular weight of about 40,000; serum albumin (horse), about 68,000. Consequently their oxyalkylation does not proceed as rapidly as when lower-molecular-weight oxyalkylation-susceptible starting materials are used. Within the class of substances which are useful starting materials here and which are composed principally of keratin, observable differences in ease of oxyalkylation exist. For example, light-colored cow hair responded to our process more readily than did a dark-colored hair composed of a mixture of horse hair and hog hair. Such variations are to be expected in a procedure in which such a variety of starting materials are usable.

As examples of our process, in which the foregoing starting materials are usable, the following are typical but not exclusive.

In all cases, the apparatus employed to produce the products in the laboratory was a conventional resin pot assembly, fitted with a stirrer. This is a glass apparatus comprising a lower bowl or vessel, and an upper cap section containing several outlets, for the stirrer shaft, a thermometer, and a reflux condenser, and a charge hole fitted with a stopper. The design is conventional and need not be described further. Heat is supplied by a glass-textile heating mantle which fits the lower portion of the assembly, and which is regulated by inclusion of a rheostat in the electrical circuit. Such devices are likewise wholly conventional, and require no description here. Motor-driven stirrers, of the kind here used, and having stainless-steel or glass shafts and paddles, are likewise conventional laboratory equipment.

*Example 1*

We heated 1 gram of chopped cow hair with 1 gram of powdered potassium carbonate and 100 grams of ethylene carbonate, with stirring, in a conventional laboratory glass resin pot assembly, increasing the temperature over a period of about 1 hour to about 150° C., and then heating at about 190°–200° C. for 4 hours, by which time the hair had disappeared. The product was a dark liquid.

*Example 2*

We heated 10 grams of cow hair with 1 gram of powdered potassium carbonate and 100 grams of ethylene carbonate, with stirring, in a conventional laboratory glass resin pot assembly, holding the temperature between 185° and 200° C. for 24 hours. The product was a dark liquid.

*Example 3*

We have repeated Example 1, but substituting for the cow hair, 1 gram of a mixture of hog hair and horse hair. The conditions otherwise were the same as those of Example 1, except that reaction time was 10 hours. The product was a dark liquid.

*Example 4*

We have repeated Example 2, using cow hair, but substituting for the ethylene carbonate there used 100 grams of propylene carbonate. Reaction time was 30 hours. The conditions otherwise were the same as those of Example 2. The product was a dark liquid.

*Example 5*

We have repeated Example 2, using cow hair, but substituting for the ethylene carbonate there used 100 grams of butylene carbonate. Reaction time was 48 hours. The conditions otherwise were the same as those of Example 2. The product was a dark liquid.

*Example 6*

We have repeated Example 2, using cow hair, but substituting for the ethylene carbonate there used 100 grams of hydroxypropylene carbonate. Reaction time was 48 hours. The conditions otherwise were the same as those of Example 2. The product was a dark liquid.

*Example 7*

We have repeated Example 2, using cow hair, but substituting for the ethylene carbonate there used 100 grams of hydroxybutylene carbonate. Reaction time was 60 hours. The conditions otherwise were the same as those of Example 2. The product was a dark liquid.

*Example 8*

We have repeated Example 2, using cow hair, but substituting for the ethylene carbonate there used a mixture of 44 grams of ethylene carbonate and 56 grams of propylene carbonate. Reaction time was 30 hours. The conditions otherwise were the same as those of Example 2. The product was a dark liquid.

*Example 9*

We have repeated Example 2, using cow hair and ethylene carbonate. Then, after transferring the reaction mass to a conventional oxyalkylating autoclave, adding 5 grams of sodium hydroxide, and raising the temperature to about 165° C., we have introduced 100 grams of ethylene oxide, with stirring. The second oxyalkylating step consumed about 4 hours. Maximum pressure was 50 p. s. i. The product was a dark liquid.

*Example 10*

We have repeated Example 9. Then, after introducing the ethylene oxide, we have lowered the temperature to about 125° C. and have introduced 100 grams of propylene oxide, with stirring. This operation consumed about 6 hours. Maximum pressure was 35 p. s. i. The product was a dark liquid.

*Example 11*

We have repeated Example 9, but substituting for the ethylene oxide there used 100 grams of propylene oxide, and a temperature of about 125° C., in the second oxyalkylating step. This step consumed 7 hours. Maximum pressure was about 40 p. s. i. The product was a dark liquid.

*Example 12*

We have repeated Example 8, using cow hair and a mixture of ethylene carbonate and propylene carbonate. Then, after transferring the reaction mass to a conventional oxylkylating autoclave, adding 5 grams of sodium hydroxide and heating to 140° C., we have introduced, with stirring, a mixture of 50 grams of ethylene oxide and 50 grams of propylene oxide. The second oxyalkylating step consumed 8 hours. Maximum pressure was about 40 p. s. i. The product was a dark liquid.

*Example 13*

We have repeated Example 2 but substituting for the cow hair 10 grams of commercial egg albumin. The conditions otherwise were the same as those of Example 2. The product was a dark liquid.

*Example 14*

We have repeated Example 2, but substituting for the cow hair 10 grams of commercial milk albumin. The conditions were otherwise the same as those of Example 2. The product was a dark liquid.

*Example 15*

We have repeated Example 2, but substituting for the cow hair 10 grams of blood albumin. The conditions were otherwise the same as those of Example 2. The product was a dark liquid.

*Example 16*

We have repeated Example 2, but substituting for the cow hair 10 grams of ricin. The conditions were otherwise the same as those of Example 2. The product was a dark liquid.

*Example 17*

We have repeated Example 2, but substituting for the cow hair 10 grams of serum albumin. The conditions otherwise were the same as those of Example 2. The product was a dark liquid.

*Example 18*

We have repeated Example 2, but substituting for the cow hair 10 grams of commercial dried animal blood. The conditions were otherwise the same as those of Example 2. The product was a dark liquid.

*Example 19*

We have repeated Example 2, but substituting for the cow hair 10 grams of cleaned or scoured wool. The conditions otherwise were the same as those of Example 2. The product was a dark liquid.

*Example 20*

We have repeated Example 2, but substituting for the cow hair 10 grams of hen feathers. The conditions were otherwise the same as those of Example 2. The product was a dark liquid.

*Example 21*

We introduced into a glass resin pot assembly 264 grams of ethylene carbonate and 5 grams of powdered sodium carbonate, and warmed the mixture, with stirring, to about 100°–120° C. We then added in small increments 30 grams of commercial rennet casein, and continued to stir and heat cautiously until the temperature reached 160° C. At this point foaming became evident, carbon dioxide being liberated. We continued to heat and stir for a total of 3.5 hours, the temperature lying mostly between 175° and 190° C. The product was a viscous, dark liquid.

*Example 22*

We have repeated Example 21, using casein, but substituting for the ethylene carbonate there used 306 grams of propylene carbonate. The reaction time was 4 hours. The conditions otherwise were the same as those of Example 21. The product was a viscous, dark liquid.

*Example 23*

We have repeated Example 21, using casein, but substituting for the ethylene carbonate there used 348 grams of butylene carbonate. The reaction time was 5 hours. The conditions otherwise were the same as those of Example 21. The product was a viscous, dark liquid.

*Example 24*

We have repeated Example 21, using casein, but substituting for the ethylene carbonate there used 354 grams of hydroxypropylene carbonate. The reaction time was 4.5 hours. The conditions otherwise were the same as those of Example 21. The product was a viscous, dark liquid.

*Example 25*

We have repeated Example 21, using casein, but substituting for the ethylene carbonate there used 396 grams of hydroxybutylene carbonate. The reaction time was 5 hours. The conditions otherwise were the same as those of Example 21. The product was a dark, viscous liquid.

*Example 26*

We have repeated Example 21, using casein, but substituting for the ethylene carbonate there used a mixture of 132 grams of ethylene carbonate and 153 grams of propylene carbonate. The reaction time was 4 hours. The conditions otherwise were the same as those of Example 21. The product was a viscous, dark liquid.

*Example 27*

We have repeated Example 21, using casein and ethylene carbonate. Then, after transferring the reaction mass to a conventional oxyalkylating autoclave, adding 5 grams of sodium hydroxide and raising the temperature to about 165° C., we have introduced 132 grams of ethylene oxide, with stirring. The second oxyalkylating step consumed about 3 hours. Maximum pressure was about 50 p. s. i. The product was a viscous, dark liquid.

*Example 28*

We have repeated Example 27. Then, after introducing the ethylene oxide, we have lowered the autoclave temperature to about 125° C. and have introduced 174 grams of propylene oxide, with stirring. This operation consumed about 4 hours. Maximum pressure was 40 p. s. i. The product was a viscous, dark liquid.

*Example 29*

We have repeated Example 27, but substituting for the ethylene oxide there used 174 grams of propylene oxide, and a temperature of about 125° C., in the second oxyalkylating step. This step consumed 4 hours. Maximum pressure was about 40 p. s. i. The product was a viscous, dark liquid.

Example 30

We have repeated Example 26, using casein and a mixture of ethylene carbonate and propylene carbonate. Then, after transferring the reaction mass to a conventional oxyalkylating autoclave, adding 5 grams of sodium hydroxide and heating to 140° C., we have introduced, with stirring a mixture of 132 grams of ethylene oxide and 174 grams of propylene oxide. This second oxyalkylating step consumed 5 hours. Maximum pressure was about 40 p. s. i. The product was a viscous, dark liquid.

Example 31

We have repeated Example 21, but substituting for the casein there used 30 grams of gliadin. The conditions otherwise were the same as those of Example 21. The product was a dark, viscous liquid.

Example 32

We have repeated Example 21, but substituting for the casein there used 30 grams of commercial zein. The conditions otherwise were the same as those of Example 21. The product was a dark, viscous liquid.

Example 33

We have repeated Example 21, but substituting for the casein there used 30 grams of glutenin. The conditions were otherwise the same as those of Example 21. The product was a viscous, dark liquid.

Example 34

We have repeated Example 21, but substituting for the casein there used 30 grams of hordein. The conditions were otherwise the same as those of Example 21. The product was a viscous, dark liquid.

The products obtained as described above are surface-active, and hence are usable where low-surface-tension solutions are useful, as in special wetting, dispersing, and emulsifying operations. They are useful in demulsifying processes in which water and oil are separated from their emulsions, and particularly crude oil and oil-field waters. The oxyalkylated proteins of this invention find utility as foam producers in fire protection systems of the foam type.

Reference is made to our copending applications Serial Nos. 359,667 and 359,669. The subject matter of those two applications is consolidated in the present application, and the present application is therefore a substitute for those two applications.

We claim:

1. A process for preparing substantially anhydrous, substantially undiluted oxyalkylated derivatives from an anhydrous, solid, oxyalkylation-susceptible protein, which solid satisfies one of the following two conditions: ($a$) it is infusible; ($b$) it suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in reacting said anhydrous solid with at least one anhydrous alkylene carbonate selected from the class consisting of ethylene carbonate, propylene carbonate, butylene carbonate, hydroxypropylene carbonate, and hydroxybutylene carbonate, by contacting said solid and said alkylene carbonate in presence of an anhydrous oxyalkylation catalyst, at a temperature producing effervescence of carbon dioxide and for a period of time sufficient to form an oxyalkylated derivative of said solid; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid.

2. A two-step process for preparing substantially anhydrous, substantially undiluted oxyalkylated derivatives from an anhydrous, solid, oxyalkylation-susceptible protein, which solid satisfies one of the following two conditions: ($a$) it is infusible; ($b$) it suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in: (A) first reacting said anhydrous solid with at least one anhydrous alkylene carbonate selected from the class consisting of ethylene carbonate, propylene carbonate, butylene carbonate, hydroxypropylene carbonate, and hydroxybutylene carbonate, by contacting said solid and said alkylene carbonate in presence of an anhydrous oxyalkylation catalyst, at a temperature producing effervescence of carbon dioxide and for a period of time sufficient to form an oxyalkylated derivative of said solid; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one member selected from the aforesaid class of alkylene oxides.

3. The process of claim 2, wherein the alkylene carbonates used are characterized by possessing at least 2 and not more than 3 carbon atoms and free from hydroxyl groups.

4. The process of claim 2, wherein the alkylene carbonates and the alkylene oxides used are characterized by possessing at least 2 and not more than 3 carbon atoms and free from hydroxyl groups.

5. The process of claim 2, wherein the alkylene carbonates and the alkylene oxides used are characterized by possessing at least 2 and not more than 3 carbon atoms and free from hydroxyl groups, and wherein the oxyalkylation-susceptible starting material is keratin.

6. The process of claim 2, wherein the alkylene carbonates and the alkylene oxides used are characterized by possessing at least 2 and not more than 3 carbon atoms and free from hydroxyl groups, and wherein the oxyalkylation-susceptible starting material is hair.

7. The process of claim 2, wherein the alkylene carbonates and the alkylene oxides used are characterized by possessing at least 2 and not more than 3 carbon atoms and free from hydroxyl groups, and wherein the oxyalkylation-susceptible starting material is wool.

8. The process of claim 2, wherein the alkylene carbonates and the alkylene oxides used are characterized by possessing at least 2 and not more than 3 carbon atoms and free from hydroxyl groups, and wherein the oxyalkylation-susceptible starting material is albumin.

9. The process of claim 2, wherein the alkylene carbonates and the alkylene oxides used are characterized by possessing at least 2 and not more than 3 carbon atoms and free from hydroxyl groups, and wherein the oxyalkylation-susceptible starting material is blood albumin.

10. The process of claim 2, wherein the alkylene carbonates and the alkylene oxides used are characterized by possessing at least 2 and not more than 3 carbon atoms and free from hydroxyl groups, and wherein the oxyalkylation-susceptible starting material is dried blood.

11. The process of claim 2, wherein the alkylene carbonates and the alkylene oxides used are characterized by possessing at least 2 and not more than 3 carbon atoms and free from hydroxyl groups, and the oxyalkylation-susceptible starting material is casein.

12. The process of claim 2, wherein the alkylene carbonates and the alkylene oxides used are characterized by possessing at least 2 and not more than 3 carbon atoms and free from hydroxyl groups, and the oxyalkylation-susceptible starting material is zein.

No references cited.